Jan. 22, 1952 — E. A. LARSSON — 2,583,487
SPRING
Filed Jan. 16, 1947

Inventor
ERNST A LARSSON
By
Attorney

Patented Jan. 22, 1952

2,583,487

UNITED STATES PATENT OFFICE 2,583,487

SPRING

Ernst A. Larsson, Mansfield, Ohio, assignor to The Ohio Brass Company, Mansfield, Ohio, a corporation of New Jersey Application January 16, 1947, Serial No. 722,398

3 Claims. (Cl. 267—63)

My invention relates to springs and has particular reference to springs used in connection with resilient anchorages for car couplers.

In anchorages for car couplers, as for instance, anchorages of the type disclosed in detail in U. S. Letters Patent 2,225,418 and 2,235,618, it will be noted that in each case helical springs are disclosed at the upper part of the anchorage to assist in the vertical alignment of the coupler head.

These springs are made of steel and are sometimes placed at the lower part of the anchorage and in either position are under compression. In time these springs not infrequently rust and corrode and lose their life, since the couplers in question are most frequently used in mines where it is damp and the moisture contaminated with acid and alkali salts. When this happens the head of the coupler sags thus preventing in many cases automatic coupling when two heads are brought together.

In cases where the cars or their frames are of steel to which the couplers are attached, steel springs are often subjected to heavy currents, especially starting currents and this heats the springs sufficiently to draw their temper and permit them to collapse and so become useless.

The metal springs referred to are individual that is the anchorage may employ one or more springs. However, I have found it would be an advantage in some cases if the coil springs could be connected together as a unit where two or more springs are employed to an anchorage, but such connection of the individual steel springs into a single unit is not practical.

To avoid the trouble resulting from the corrosion and heating of the metal springs in service and to receive the benefit arising from using a single resilient unit in place of two or more individual units, I employ a resilient or elastic non-metallic material and so mold the several individual spring units as to form a single unit. In a combination structure of this type the single unit thus is a body comprising several resilient elements or portions and these terms are used in this sense in this specification and in the appended claims.

In the drawing—

Figure 3:
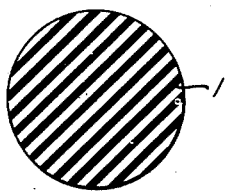
Figure 3 is a section on the line 3—3 of Figure 2.
Figure 2:
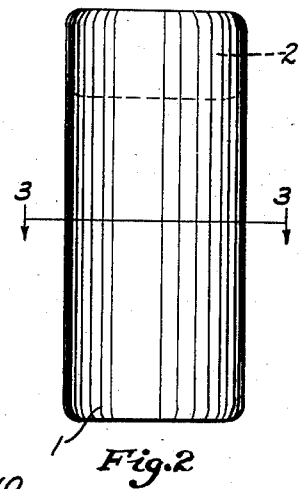
Figure 2 is an end view of Figure 1.

In the embodiment of my invention disclosed in Figures 1 to 4 inclusive, I have shown a body composed of a plurality (3) of individual portions 1 connected by the bridging members 2. The cross-section of the portions 1 is shown in Figure 3 as a round solid, but the shape may vary to suit requirements or secure different results, as for instance, square, oval, corrugated, triangular, tubular, etc.

The bridging member 2 is shown of rectangular cross-section but may be of other shape to meet requirements.

The portions 1 and bridging member 2 are molded in a single unit of two or more individual units although there may be conditions in which the individual elements 1 are used as such and not connected.

The portions are composed of an elastic or resilient material and may be molded from any one of a number of compositions, but one material which will be suitable for the purpose intended is that known as car-spring rubber. This may be made more or less resilient or elastic depending upon the requirements by a change in composition or vulcanization.

If the individual portions 1 are not confined in tubular cases which are of such diameter as to prevent the diameter or cross-section of the portions 1 to enlarge under compressive forces, then the portions may be of uniform diameter throughout their length, but if means is present which prevents such expansion then the portions 1 will act as solid columns of material and not function as a yielding spring.

Figure 5:
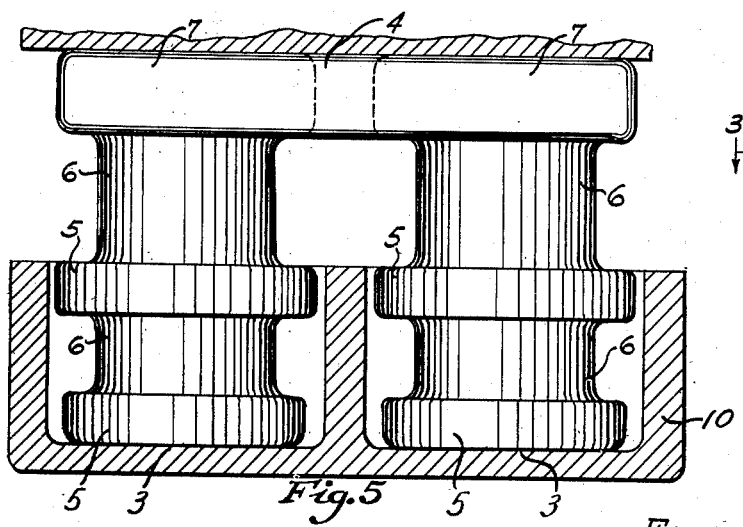
Figure 5 is a side view in elevation of another elastic or resilient unit composed of a plurality of connected individual units of different form from that shown in Figure 1.

Therefore, I have shown in Figure 5 a portion 3 which may be used either singly or in a body as a plurality of individual portions connected by a bridging member 4, and which are yieldable when closely surrounded or supported by a metal casing 10. Here enlarged diameter parts 5 would not expand when restricted by closely fitting casing 10 but reduced diameter parts 6 being unrestricted would expand permitting the column to yield longitudinally under a compressive force.

Also in Figure 5 the portions of the bridging member 4 would not expand or yield if closely held by a non-yieldable casing.

Figure 1:
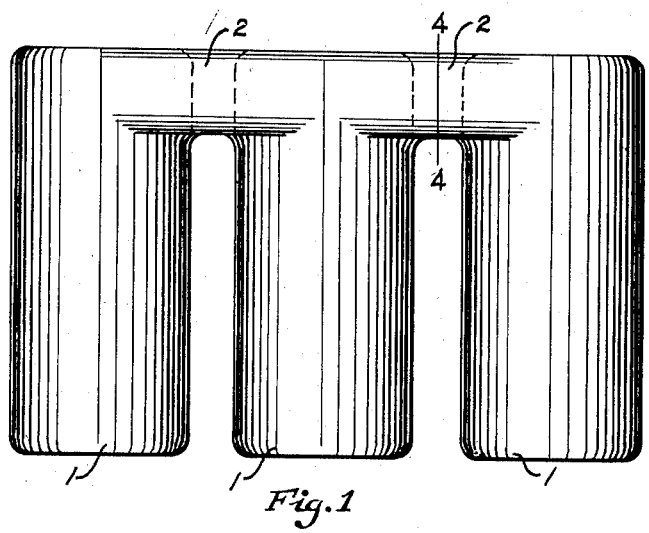
Figure 1 is a side view in elevation of a resilient or elastic unit composed of a plurality of connected individual units.
Figure 4:
Figure 4 is a section of the connecting portion between two individual units taken on the line 4—4 of Figure 1.

While rubber compositions are preferable from which the units of Figures 1 and 5 are made some of the so-called plastics may be found equally as suitable, such as some of the so-called silicones if they possess proper elasticity or resiliency.

It will be understood that various changes in size, shape and relation of the parts may be resorted to without departing from the spirit or scope of the appended claims, some such changes being referred to supra.

I claim:

1. A device for use in a car coupler comprising a plurality of tubular, supporting and restraining, metal cases and a body having a plurality of solid, resilient, non-metallic portions projecting from one side thereof and disposed in said cases, said portions being deformable laterally and longitudinally under compressive forces applied longitudinally thereof, said cases being spaced laterally from parts of said portions therein and serving to limit the extent of lateral deformation of said portions.

2. A device for use in a car coupler comprising a plurality of tubular, supporting and restraining, metal cases and a body having a plurality of solid, longitudinally and laterally deformable, resilient, non-metallic portions projecting from one side thereof and disposed in said cases, each portion having parts of substantially the same cross-sectional area as that of its case and portions of smaller cross-sectional area which are deformable laterally toward the side walls of its case under compressive forces applied longitudinally of the portion, said cases serving to limit the extent of lateral deformation of said small parts.

3. A spring for use in a car coupler having a plurality of tubular, supporting and restraining cases, comprising a body of non-metallic, resilient material having a plurality of solid, longitudinally and laterally deformable portions integral therewith and projecting from one side thereof to extend into said cases, each portion having a plurality of annular, longitudinally spaced ribs of a size substantially to engage the inner surface of the side walls of its case, other parts of the portion being smaller than the ribs and deformable laterally against the side walls of said cases under compressive forces applied longitudinally of the portions.

ERNST A. LARSSON.

REFERENCES CITED

The following references are of record in the file of this patent:

UNITED STATES PATENTS

| Number | Name | Date |
|---|---|---|
| 98,540 | Alden | Jan. 4, 1870 |
| 237,040 | Moore | Jan. 25, 1881 |
| 1,982,516 | Holmstead | Nov. 27, 1934 |
| 2,179,148 | Gerlofson | Nov. 7, 1939 |
| 2,205,098 | Lamont | June 18, 1940 |

FOREIGN PATENTS

| Number | Country | Date |
|---|---|---|
| 527 | Great Britain | 1910 |
| 476,678 | Great Britain | Dec. 8, 1937 |
| 475,849 | Germany | May 2, 1929 |